United States Patent [19]

Sievers

[11] Patent Number: 5,783,031

[45] Date of Patent: Jul. 21, 1998

[54] DEVICE FOR INSTALLING LABELS ON COMPACT DISCS

[76] Inventor: Gail Sievers, 1395 Greg St., Suite 108, Sparks, Nev. 89431

[21] Appl. No.: 547,938

[22] Filed: Oct. 25, 1995

[51] Int. Cl.[6] ................................................. B32B 31/00
[52] U.S. Cl. ........................... 156/556; 156/514; 156/579
[58] Field of Search .................................... 156/556, 579, 156/514, 379.8

[56] References Cited

U.S. PATENT DOCUMENTS

| | | | |
|---|---|---|---|
| 4,306,344 | 12/1981 | Floss | 29/238 |
| 4,687,536 | 8/1987 | Hiramatsu et al. | 156/514 X |
| 5,316,464 | 5/1994 | Lexell | 156/378 X |
| 5,412,950 | 5/1995 | Parrish | 156/579 |
| 5,435,246 | 7/1995 | Edman | 101/333 |
| 5,489,360 | 2/1996 | Shimizu et al. | 156/542 |

OTHER PUBLICATIONS

CD-ROM Professional. vol. 8—No. 10, p. 132 Oct. 1995 Advertisement at top of page has competing product. Indicates patent pending. Copy attached.

*Primary Examiner*—James Engel
*Attorney, Agent, or Firm*—Oldham & Oldham Co., L.P.A.

[57] ABSTRACT

A device for applying annular paper labels to compact discs is disclosed. The device has a base for holding the discs and a cap for centering the labels on the discs. The process for using the device is also disclosed.

5 Claims, 2 Drawing Sheets

DEVICE FOR INSTALLING LABELS ON COMPACT DISCS

BACKGROUND OF THE INVENTION

1. Field of the Invention

This invention relates generally to the field of labels. Specifically, the invention is designed to be a device for installing annular labels to compact discs, as well as a process for installing annular labels on compact discs using the device.

2. Description of Related Art

In the last few years, users of micro-computers have had the option of using a new type of storage medium generically known as a writable compact disc. This compact disc differs from other compact discs in that the consumer buys the disc without any information on the disc and then can write (once only, with current technology) information to the disc. Upon writing information to the disc, the consumer is faced with the problem of labeling the disc for future reference. The prior art consists of a strip of paper containing a series of annular paper labels. The consumer typically types or otherwise places relevant information on these labels and then carefully places them on the disc. The consumer must exercise care at this point because the disc must be free to turn in the disc drive on the computer. This means that the label cannot cover the hole in the center of the disc or protrude over the edge of the disc. In addition to writable compact discs, the end user may wish to apply labels to discs which already have information on them (for example, compact discs sold with music on them). There is a prior art device, identified in the accompanying information disclosure statement, which attempts to make the attachment of the annular label to the compact disc simpler for the consumer. This prior art device has the drawback of being both more complicated to use and, it is believed, more expensive to manufacture, than the present invention.

Accordingly, there is a need for a device for attaching annular labels to compact discs which is simple to use and inexpensive to manufacture.

SUMMARY OF THE INVENTION

A device which meets the foregoing needs and other objects is disclosed. A process for using the device is also disclosed. The device is comprised of a two-level base with a post in the center of the base. A compact disc is slipped over the post and rests on the upper level of the base. A cap is then placed over the post which allows an annular paper label to be centered on the disc.

It is an object of the invention to produce a device for installing annular labels on compact discs where the device is inexpensive to manufacture.

It is a further object of the invention to provide a device for installing annular labels on compact discs where the device is easy to use.

It is a further object of the invention to provide a process for installing annular labels on compact discs using the device which is the subject of the present invention.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the claims.

DESCRIPTION OF THE PREFERRED EMBODIMENT

Figure 1:
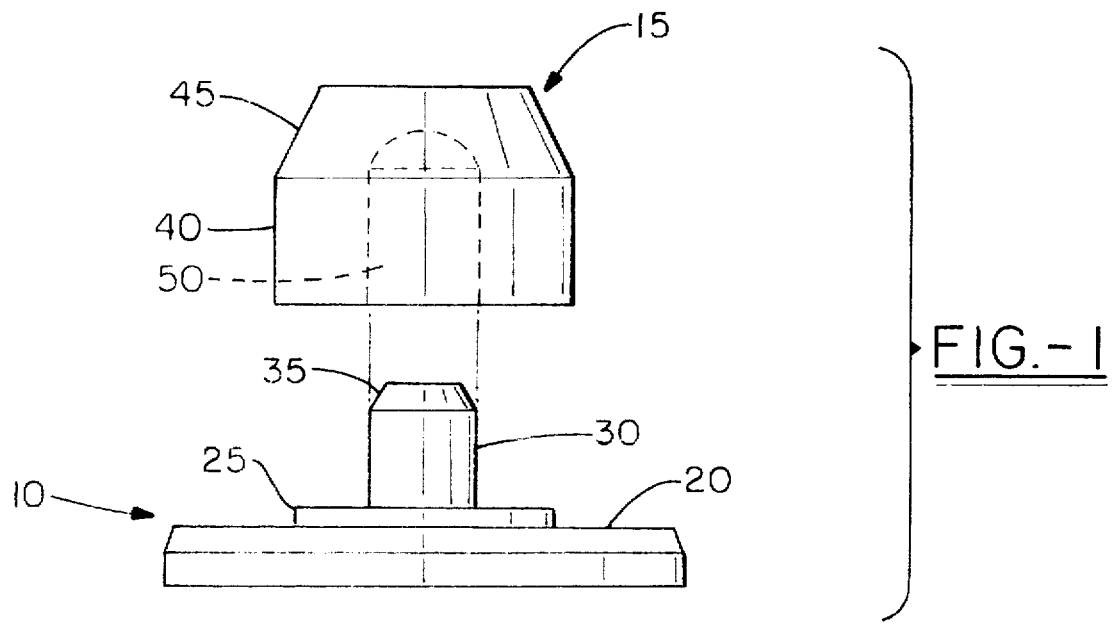
FIG. 1 is an elevational view of the invention.

FIG. 1 shows the device, with a base, 10, which has a raised portion, 25, and a lower portion, 20. The base, 10, has a post, 30, with an angled top, 35. There is also a cap, 15, with a straight lower portion, 40, an angled upper portion, 45, and a cylindrical internal cavity, 50, which detachably engages the post, 30. The post, 30, is of a diameter slightly smaller than the cavity, 50. The cavity, 50, should be of approximately the same diameter as the center hole on a compact disc. The cap 15 has a lower portion 40, with a diameter which is slightly smaller than the diameter of the center hole of a typical annular paper label. The angled edge, 45, aids in centering the label over the disc. Likewise, the angled edge, 35, aids in centering the cap, 15, over the post, 30. The raised portion, 25, must be small enough so that it does not touch the writable/readable surface of the compact disc. The base, 10, and the cap, 15, can be most conveniently made from a hard, rigid plastic, such as ABS plastic. The use of ABS plastic allows for particularly inexpensive manufacture of the invention by injection molding. The plastic can be clear or else colored for a pleasing aesthetic effect. Other plastics, such as polycarbonate or acrylic could also be used, and the invention can also be manufactured in other ways, such as by milling solid blocks of plastic. If desired, the invention could even be manufactured from non-plastic materials such as glass, wood or metal. The compact discs are well known in the prior art. As different sizes of compact discs are manufactured in the future, it may be necessary to alter slightly the diameter of the post, 30, or the cap, 15. The annular paper labels are also well known in the art. Suffice it to say that the labels are self adhesive on one side and are typically sold in sheets of several labels. The invention is currently intended for use with compact discs which are well known in the prior art, but it is foreseeable that the computer industry may manufacture, in the future, other computer storage media with an annular shape which will also be capable of being labeled with the current invention.

Figure 2:
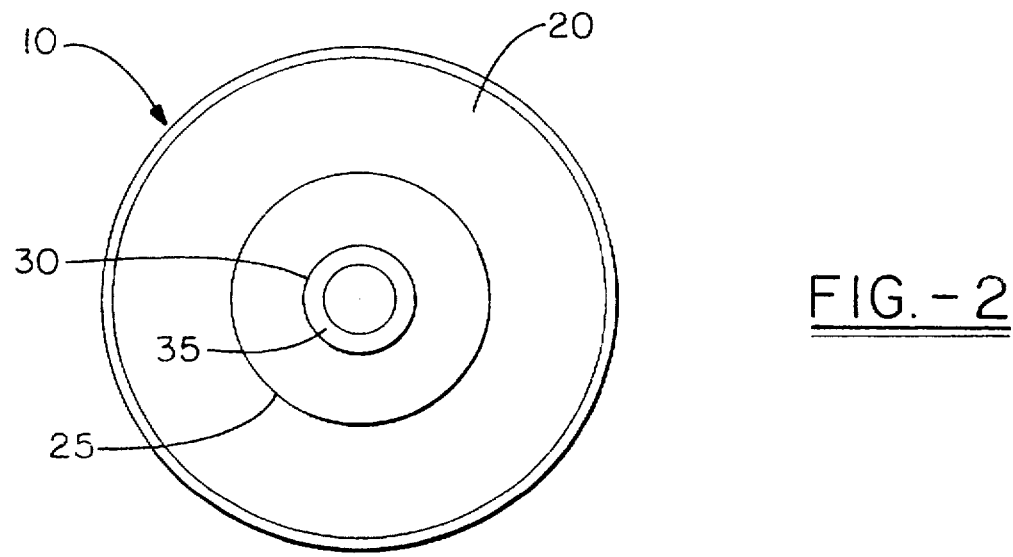
FIG. 2 is a top plan view of the invention, shown without the cap.

FIG. 2 shows a top plan view of the base, 10, without the cap, 15. This view illustrates the overall circular shape of the device. The circular shape is the best mode for carrying out the invention, but is not essential. Likewise, although the labels are currently annular in shape, the invention could be used with labels which have other shapes, such as half-circles.

Figure 3:
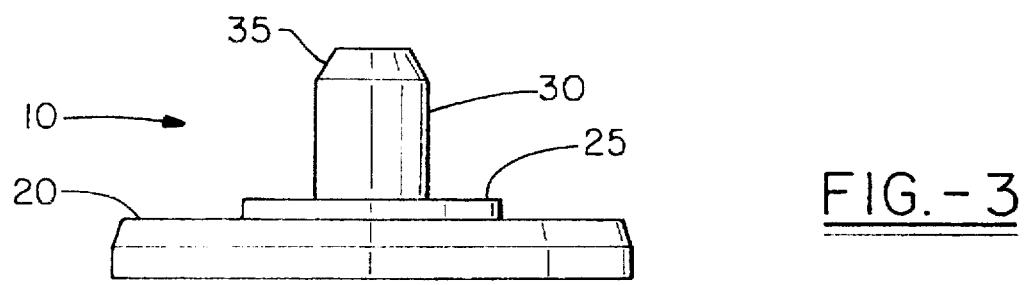
FIG. 3 is an elevational view of the invention, shown without the cap.

FIG. 3 shows an elevational view of FIG. 3, again without the cap, 15.

Figure 4:
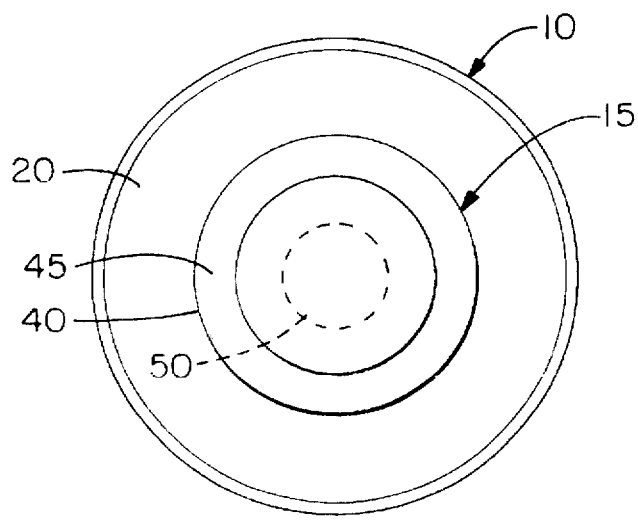
FIG. 4 is a top plan view of the invention with the cap.

FIG. 4 shows a top plan view similar to FIG. 2, except that the cap, 15, is shown installed.

Figure 5:
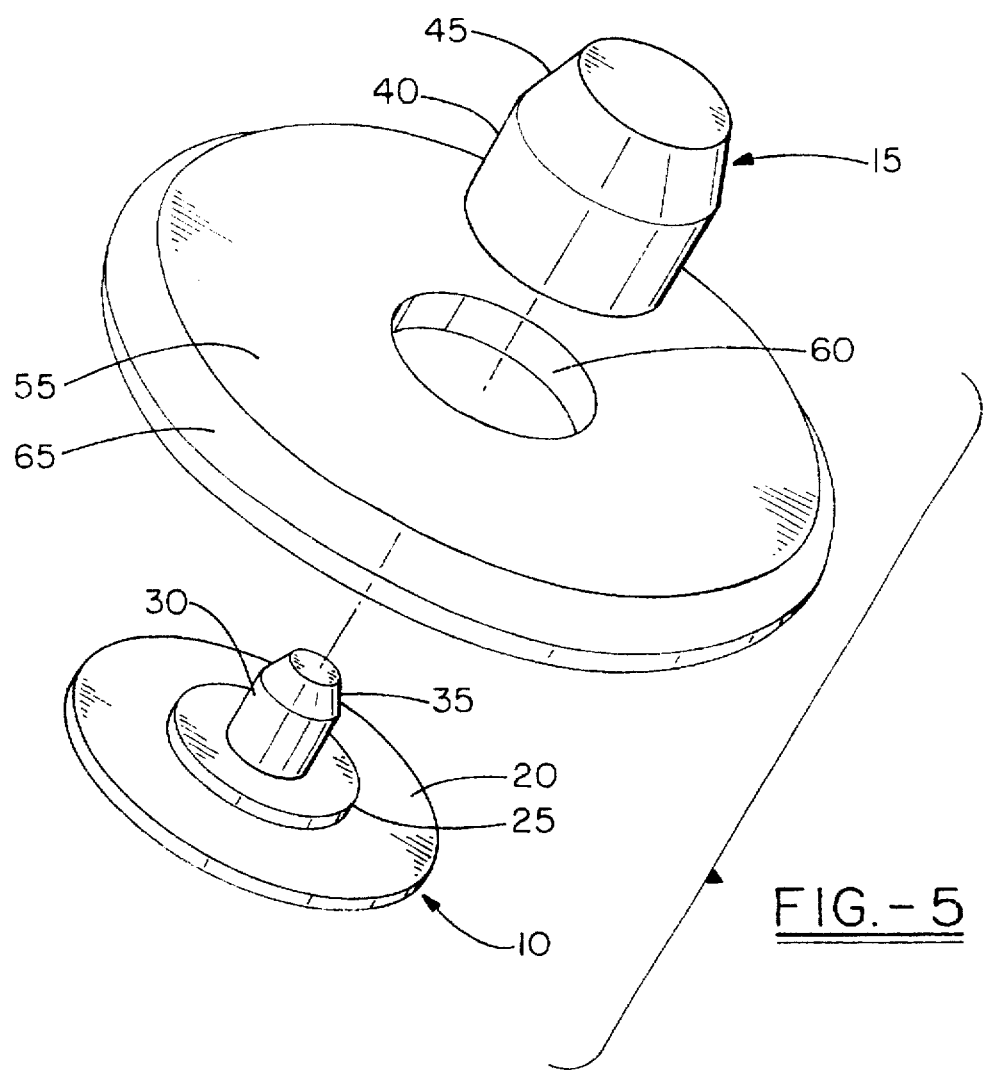
FIG. 5 is a perspective, exploded view of the invention, showing an annular paper label.

FIG. 5 shows an exploded, perspective view of the invention, demonstrating that a compact disc, 65, is centered over the post, 30, and then the disc, 65, is slid over the post, 30, until the disc, 65, rests on the raised portion, 25. It is important that the writable/readable side of the disc be placed so that it is next to, but not touching, the lower portion, 20, of the base, 10. The cap, 15 (shown on top for clarity) is then placed on the post, 30, so that the post, 30, is detachably inserted into the cavity, 50, of the cap, 15. Finally, the annular paper label, 55, which is manufactured with an adhesive on one side, is placed adhesive side down on the compact disc, 65, using the cap, 15, to center the label, 55, over the disc, 65. The end user will typically apply a very slight finger pressure over the surface of the label to ensure a uniform bond between the label, 55, and the disc, 65. The label, 55, will have relevant information typed or written on it before being installed on the disc, 65. The end user will then remove the cap, 15, and the disc, 65, with its attached label, 55.

It is to be understood that this is merely the best mode for carrying out the invention. Minor changes in the arrangement of the invention are possible. For example, the post, 30, could be attached to the cap, 15, and the cavity, 50, could be built into the base, 10. Or the cap, 15, could be combined with the post, 30, and the entire base, 10, could be eliminated. Also, with the post, 30, either attached to the base, 10, or the cap, 15, the base could be modified so that the lower portion, 20, is eliminated. Further, the raised portion, 25, and/or the angled edges, 35 and 45, could be eliminated. It should also be noted that the labels can be made of materials other than paper, e.g. plastic, and that such labels could still be used with the current invention.

Each of the elements described above, or two or more together, may also find a useful application in other types of methods differing from the type described above. While certain novel features of this invention have been shown and described and are pointed out in the annexed claims, it is not intended to be limited to the details above, because various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A device for concentrically applying an annular label having an internal diameter to a compact disc having a first surface which is non writable/readable and an opposing second surface which is generally writable/readable with a non writable/readable portion near the center thereof, said device comprised of:
   a. a means for centering and holding the compact disc over a base such that only the non writable/readable portion of the second surface contacts the base; and
   b. a means cooperative with said centering and holding means for centering a label over the compact disc and allowing the label to be attached to the compact disc, said means having an external diameter at least as large as the diameter of the non writable/readable portion of the second surface.

2. The device of claim 6, wherein:
   a. the means for centering and holding the compact disc is comprised of:
      i. a base comprised of:
         (1) a flat, circular disc;
         (2) a flat, circular raised portion in the center of the disc which has a diameter smaller than the non-writable/readable portion at the center of the second surface of the compact disc, and where the raised portion holds the writable/readable area of the second surface slightly above the flat, circular disc;
         (3) a circular post in the center of the raised portion where the post has a diameter slightly smaller than the diameter of the hole in the center of a compact disc; and
      ii. the means for centering the label is comprised of:
         (1) a cap with a diameter slightly smaller than the diameter of the hole in the center of the annular paper label;
         (2) a cavity in the cap which detachably engages the circular post and centers the cap over the post.

3. A process for applying an annular label having an internal diameter to a compact disc having a first surface which is non writable/readable and an opposing second surface which is generally writable/readable with a non writable/readable portion near the center thereof, comprised of the steps of:
   a. placing the compact disc over a means for centering and holding the compact disc over a base such that only the non writable/readable portion of the second surface contacts the base;
   b. placing a means cooperative with said centering and holding means for centering the label over the compact disc and allowing the label to be attached to the compact disc over said centering and holding means, said means having an external diameter at least as large as the diameter of the non writable/readable portion of the second surface;
   c. centering a paper label over said cooperative means with the adhesive side of the label towards the compact disc and placing said label on said disc.

4. A process for applying an annular label having an internal diameter to a compact disc having a first surface which is non writable/readable and an opposing second surface which is generally writable/readable with a non writable/readable portion near the center thereof, comprised of the steps of:
   a. placing the compact disc on a base, with the generally writable/readable surface of the disc towards the base, where the base is comprised of:
      i. a flat, circular disc;
      ii a flat, circular raised portion in the center of the disk which has a diameter smaller than the non-writable/readable area at the center of a compact disc, and where the raised portion holds the writable/readable area of the compact disc slightly above the flat, circular disc;
      iii. a circular post in the center of the raised portion where the post has a diameter slightly smaller than the diameter of the hole in the center of a compact disc;
   b. placing a cap having an external diameter at least as large as the diameter of the non writable/readable portion of the second surface on the base where the cap is comprised of:
      i. a cylindrical body with an external diameter slightly smaller than the diameter of the hole in the center of the annular paper labels;
      ii. a cavity in the body which detachably engages the circular post and centers the cap over the post;
   c. centering an annular paper label over the cap with the adhesive side of the label towards the compact disc and placing the label on the disc.

5. A kit of parts for applying annular labels to compact discs comprised of:

i. means for centering and holding the compact disc comprised of:
   (1) a flat, circular disk;
   (2) a flat, circular raised portion in the center of the disk which has a diameter smaller than the non-writable/readable area at the center of a compact disc, and where the raised portion holds the writable/readable area of the compact disc slightly above the flat, circular disk; and
   (3) a circular post in the center of the raised portion where the post has a diameter slightly smaller than the diameter of the hole in the center of a compact disc;

ii. means for centering the annular paper label on the compact disc comprised of:
   (1) a cap with an external diameter slightly smaller than the diameter of the hole in the center of the annular paper labels and at least as large as the diameter of the non writable/readable portion of the second surface; and
   (2) a cavity in the cap which detachably engages the circular post and centers the cap over the post; and iii. one or more sheets of annular paper labels sized to fit with the foregoing parts.

* * * * *